(12) United States Patent
Yang et al.

(10) Patent No.: US 12,150,197 B2
(45) Date of Patent: Nov. 19, 2024

(54) RADIO COMMUNICATION METHOD, TERMINAL DEVICE AND NETWORK DEVICE

(71) Applicant: GUANGDONG OPPO MOBILE TELECOMMUNICATIONS CORP., LTD., Guangdong (CN)

(72) Inventors: Ning Yang, Guangdong (CN); Qianxi Lu, Guangdong (CN)

(73) Assignee: GUANGDONG OPPO MOBILE TELECOMMUNICATIONS CORP., LTD., Guangdong (CN)

(*) Notice: Subject to any disclaimer, the term of this patent is extended or adjusted under 35 U.S.C. 154(b) by 772 days.

(21) Appl. No.: 17/234,309

(22) Filed: Apr. 19, 2021

(65) Prior Publication Data

US 2021/0243833 A1 Aug. 5, 2021

Related U.S. Application Data

(63) Continuation of application No. PCT/CN2018/112107, filed on Oct. 26, 2018.

(51) Int. Cl.
*H04W 76/27* (2018.01)
*H04W 4/40* (2018.01)
*H04W 72/04* (2023.01)
*H04W 76/14* (2018.01)

(52) U.S. Cl.
CPC ........... *H04W 76/27* (2018.02); *H04W 72/04* (2013.01); *H04W 76/14* (2018.02); *H04W 4/40* (2018.02)

(58) Field of Classification Search
CPC ..... H04W 76/27; H04W 72/04; H04W 76/14; H04W 4/40; H04W 72/23; H04W 76/18; H04W 76/34; H04W 76/23
See application file for complete search history.

(56) References Cited

U.S. PATENT DOCUMENTS

2018/0227973 A1* 8/2018 Tsuboi .................. H04W 8/005
2019/0141771 A1* 5/2019 Ma ........................ H04W 76/27

FOREIGN PATENT DOCUMENTS

| CN | 106341794 | 1/2017 |
|---|---|---|
| CN | 107592327 | 1/2018 |
| EP | 3831143 | 6/2021 |
| EP | 3840519 | 6/2021 |

OTHER PUBLICATIONS

Ericsson, "gNB-scheduled Resource Allocation for Sidelink," 3GPP TSG-RAN WG2 #103-Bis, TDoc R2-1815035, Oct. 2018, 4 pages.
(Continued)

*Primary Examiner* — Kyaw Z Soe
(74) *Attorney, Agent, or Firm* — Hodgson Russ LLP

(57) ABSTRACT

Provided are a radio communication method, a terminal device and a network device, wherein same can realize the timely and fast configuration of a direct link resource. The method comprises: during the establishment or recovery of a radio resource control (RRC) connection of a terminal device, the terminal device receiving a first message sent by a network device, wherein the first message comprises information of a direct link resource configured or updated by the network device.

19 Claims, 3 Drawing Sheets

(56) References Cited

OTHER PUBLICATIONS

Huawei et al., "Discussion on L3 CP related aspects for NR sidelink," 3GPP TSG-RAN WG2 # 103bis, R2-1814246, Oct. 2018, 5 pages.
ZTE, "Initial consideration on NR V2X resource allocation," 3GPP TSG-RAN WG2#103bis, R2-1814168, Oct. 2018, 7 pages.
WIPO, International Search Report and Written Opinion for PCT/CN2018/112107, Jul. 25, 2019.
Sony, "Open Issues on RRC Signalling for resource authorization," 3GPP TSG-RAN WG2 Meeting #87bis, R2-144405, Oct. 2014.
EPO, Extended European Search Report for EP Application No. 18938043.9, Oct. 8, 2021.

* cited by examiner

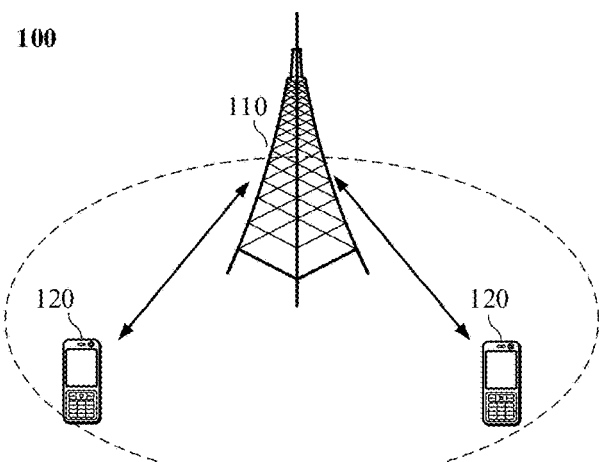
Fig. 1
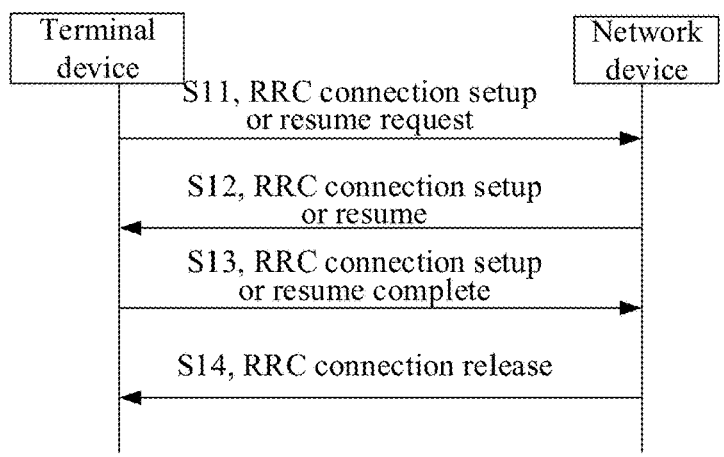
Fig. 2
Fig. 3
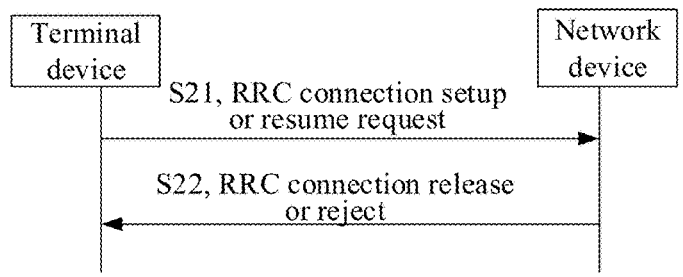
Fig. 4

RADIO COMMUNICATION METHOD, TERMINAL DEVICE AND NETWORK DEVICE

CROSS-REFERENCE TO RELATED APPLICATION

This application is a continuation of International Application No. PCT/CN2018/112107, filed Oct. 26, 2018, the entire disclosure of which is incorporated herein by reference.

TECHNICAL FIELD

The embodiments of the present application relate to the field of communications, and particularly, to a method of wireless communication, a terminal device and a network device.

BACKGROUND

In a long term evolution (LTE) system, a terminal device has an idle (IDLE) state and a connected (CONNECTED) state, where a direct link resource of the terminal device in the idle state may be configured through system information broadcast, while a direct link resource of the terminal device in the connected state may be configured through dedicated signaling (or reconfiguration signaling).

In a new radio (NR) system, a terminal device has three states: an idle state, an inactive (INACTIVE) state and a connected state. Using system information or dedicated signaling often cannot realize the timely configuration or update of a direct link resource of the terminal device. In this case, how to configure a resource is an urgent problem to be solved.

SUMMARY

The embodiments of the present application provide a method of wireless communication, a terminal device, and a network device, which is beneficial to realizing the timely and fast configuration or update of a direct link resource.

In a first aspect, there is provided a method of wireless communication, including: receiving, by a terminal device, a first message sent by a network device in a process of a radio resource control (RRC) connection setup or resume of the terminal device, where the first message includes information of a direct link resource configured or updated by the network device.

In a second aspect, there is provided a method of wireless communication, including: receiving, by a terminal device, system information sent by a network device, where the system information includes information of a first direct link resource configured or updated by the network device, and where the terminal device is in an idle state or an inactive state; and determining, by the terminal device, a target direct link resource for a direct link according to the information of the first direct link resource.

In a third aspect, there is provided a method of wireless communication, including: sending, by a network device, a first message to a terminal device in a process of a radio resource control (RRC) connection setup or resume of the terminal device, where the first message includes information of a direct link resource configured or updated by the network device.

In a fourth aspect, there is provided a method of wireless communication, including: sending, by a network device, system information to a terminal device, where the system information includes information of a first direct link resource configured or updated by the network device, and where the terminal device is in an idle state or in an inactive state.

In a fifth aspect, there is provided a terminal device configured to perform the method in any of the foregoing first aspect to second aspect or in various implementations thereof. Specifically, the terminal device includes a unit configured to perform the method in any of the foregoing first aspect to second aspect or in various implementations thereof.

In a sixth aspect, there is provided a network device configured to perform the method in any of the foregoing third aspect to fourth aspect or in various implementations thereof. Specifically, the network device includes a unit configured to perform the method in any of the foregoing third aspect to fourth aspect or in various implementations thereof.

In a seventh aspect, there is provided a terminal device, the terminal device includes: a processor and a memory. The memory is configured to store a computer program, and the processor is configured to call and run the computer program stored in the memory so as to perform the method in any of the foregoing first aspect to second aspect or in various implementations thereof.

In an eighth aspect, there is provided a network device, the network device includes: a processor and a memory. The memory is configured to store a computer program, and the processor is configured to call and run the computer program stored in the memory so as to perform the method in any of the foregoing third aspect to fourth aspect or in various implementations thereof.

In a ninth aspect, there is provided a chip configured to implement the method in any of the foregoing first aspect to fourth aspect or in various implementations thereof.

Specifically, the chip includes: a processor, configured to call and run a computer program from a memory, so that a device installed with the chip performs the method in any of the foregoing first aspect to fourth aspect or in various implementations thereof.

In a tenth aspect, there is provide a computer-readable storage medium for storing a computer program, and the computer program causes a computer to perform the method in any of the foregoing first aspect to fourth aspect or in various implementations thereof.

In an eleventh aspect, there is provided a computer program product, including a computer program instruction, and the computer program instruction causes a computer to perform the method in any of the foregoing first aspect to fourth aspect or in various implementations thereof.

In a twelfth aspect, there is provided a computer program, and when the computer program is run on a computer, the computer is caused to perform the method in any of the foregoing first aspect to fourth aspect or in various implementations thereof.

BRIEF DESCRIPTION OF THE DRAWINGS

FIG. 1 is a schematic diagram of an application scenario provided by an embodiment of the present application.

FIG. 2 is a schematic diagram of a method of wireless communication provided by an embodiment of the present application.

FIG. 3 is a type of schematic interaction diagram of a method of wireless communication provided by an embodiment of the present application.

FIG. 4 is another type of schematic interaction diagram of a method of wireless communication provided by an embodiment of the present application.

DETAILED DESCRIPTION

Figure 5:
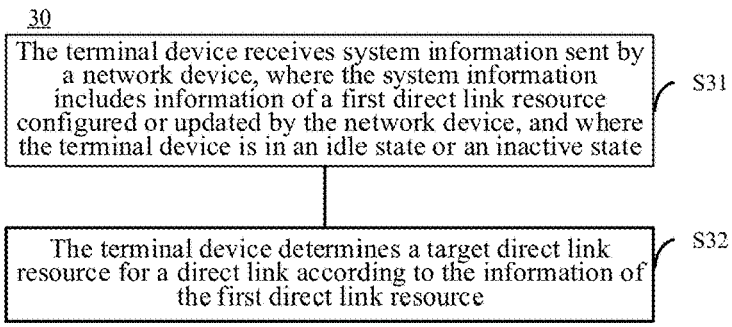
FIG. 5 is a schematic diagram of a method of wireless communication provided by another embodiment of the present application.

The technical solutions in the embodiments of the present application will be described below in conjunction with the accompanying drawings in the embodiments of the present application. Obviously, the embodiments described are part of embodiments of the present application, rather than all the embodiments. Based on the embodiments in the present application, all other embodiments obtained by those of ordinary skilled in the art without creative work fall within the scope of protection of the present application.

The technical solutions of the embodiments of the present application may be applied to various communication systems, for example, a Global System of Mobile communication (GSM), a Code Division Multiple Access (CDMA) system, a Wideband Code Division Multiple Access (WCDMA) system, General Packet Radio Service (GPRS), a Long Term Evolution (LTE) system, an LTE Frequency Division Duplex (FDD) system, LTE Time Division Duplex (TDD), a Universal Mobile Telecommunication System (UMTS), a Worldwide Interoperability for Microwave Access (WiMAX) communication system or a 5G system, etc.

Exemplarily, a communication system 100 applied in the embodiments of the present application is as shown in FIG. 1. The communication system 100 may include a network device 110, and the network device 110 may be a device which communicates with a terminal device 120 (or referred to as a communication terminal or a terminal). The network device 110 may provide communication coverage for a specific geographic area, and may communicate with the terminal device located within the coverage area. Optionally, the network device 110 may be a Base Transceiver Station (BTS) in a GSM system or a CDMA system, a NodeB (NB) in a WCDMA system, an evolutional Node B (eNB or eNodeB) in an LTE system or a wireless controller in a Cloud Radio Access Network (CRAN). Or the network device may be a mobile switching center, a relay station, an access point, an in-vehicle device, a wearable device, a hub, a switch, a bridge, a router, a network side device in a 5G network or a network device in a future evolved Public Land Mobile Network (PLMN), etc.

The communication system 100 also includes at least one terminal device 120 located within the coverage area of the network device 110. As used hereby, the "terminal device" includes, but not limited to: a connection via a wired line, as a connection via Public Switched Telephone Networks (PSTN), a Digital Subscriber Line (DSL), a digital cable, a direct cable; and/or another data connection/network; and/or an interface via wireless, as a transmitter for a cellular network, a Wireless Local Area Network (WLAN), a digital TV network such as DVB-H network, a satellite network, an AM-FM broadcast; and/or an apparatus of another terminal device set to receive/send a communication signal; and/or an Internet of Things (IoT) device. The terminal device set to communicate through a wireless interface may be referred to as a "wireless communication terminal", a "wireless terminal" or a "mobile terminal". Examples of the mobile terminal include, but not limited to: a satellite or cellular telephone; a Personal Communications System (PCS) terminal which may combine a cellular radio telephone with capabilities of data processing, faxing and data communication; a PDA which may include a radio telephone, a pager, internet/intranet access, a web browser, a notebook, a calendar, and/or a Global Positioning System (GPS) receiver; and a conventional laptop and/or palmtop receiver or other electronic apparatus including a radio telephone transceiver. The terminal device may refer to an access terminal, a User Equipment (UE), a user unit, a user station, a mobile station, a mobile platform, a remote station, a remote terminal, a mobile device, a user terminal, a terminal, a wireless communication device, a user agent or a user apparatus. The access terminal may be a cellular telephone, a cordless telephone, a Session Initiation Protocol (SIP) telephone, a Wireless Local Loop (WLL) station, a Personal Digital Assistant (PDA), a wireless communication functional handheld device, computing device or other processing device connected to a wireless modem, an in-vehicle device, a wearable device, a terminal device in a 5G network or a terminal device in a future evolved PLUM, etc.

Optionally, Device to Device (D2D) communication may be performed between the terminal devices 120.

Optionally, a 5G system or a 5G network may also be referred to as a New Radio (NR) system or a NR network.

FIG. 1 exemplarily shows one network device and two terminal devices. Optionally, the communication system 100 may include a plurality of network devices, and other number of terminal devices may be included within the coverage area of each network device, which is not limited by the embodiments of the present application.

Optionally, the communication system 100 may also include other network entity such as a network controller, a mobile management entity and the like, which is not limited by the embodiments of the present application.

It should be understood that the device with a communication function in the network/system in the embodiments of the present application may be referred to as a communication device. Taking the communication system 100 shown in FIG. 1 as an example, the communication device may include a network device 110 and a terminal device 120 with the communication function, and the network device 110 and the terminal device 120 may be the specific devices described above, which is not elaborated here; the communication device may also include other device in the communication system 100, for example, other network entity such as a network controller, a mobile management entity and the like, which is not limited in the embodiments of the present application.

It should be understood that the terms "system" and "network" herein are often used interchangeably herein. The term "and/or" herein is only to describe a kind of association relationship among associated objects, and means that there may be three kinds of relationships. For example, A and/or B, may mean that there are the following three cases: A exists alone, A and B exist at the same time, and B exists alone. In addition, the character "/" herein generally indicates that the associated objects before and after are in an "or" relationship.

FIG. 2 is a schematic flow diagram of a method of wireless communication provided by an embodiment of the present application. As shown in FIG. 2, the method 200 may include the following content.

In S210, a terminal device receives a first message sent by a network device in a process of a radio resource control (RRC) connection setup or resume of the terminal device, where the first message includes information of a direct link resource configured or updated by the network device.

Optionally, in the embodiments of the present application, the direct link resource is a resource for direct communication, and the direct link here may be a direct link for D2D communication or for Vehicle to Everything (V2X), that is, the direct link resource may be used for the direct communication between a terminal and a terminal or the direct communication between a terminal and other device, etc., which is not limited by the embodiments of the present application.

Optionally, in the embodiments of the present application, the terminal device is in a disconnected state, for example, an idle state or an inactive state, that is, the terminal device has not established a connection with the network device, or a previously established connection has been disconnected.

In the embodiments of the present application, the terminal device in the idle state or the inactive state may initiate the process of the radio resource control (RRC) connection setup or resume so as to establish or resume the RRC connection with the network device. In the process of the RRC connection setup or resume, the network device may send the first message to the terminal device, and configure or update the direct link resource for the terminal device through the first message. That is, in the embodiments of the present application, the terminal device may obtain the direct link resource configured or updated by the network device in the process of the RRC connection setup or resume, without waiting for system information or dedicated signaling to obtain the direct link resource configured or updated by the network device, which can realize the timely and fast configuration of the direct link resource, and can avoid the problem of affecting the direct communication due to insufficient resources at the same time.

Optionally, in the embodiments of the present application, the first message may be any message sent by the network device to the terminal device in a process of an existing RRC connection setup or resume, for example, an RRC connection setup message, an RRC connection resume message, an RRC connection reject message or an RRC connection release message, etc.; or a new message may be added in the process of the RRC connection setup or resume, where the new message is specially used for the network device configuring or updating the direct link resource.

It should be understood that the RRC connection setup message may be used for indicating that the network device agrees to establish the RRC connection with the terminal device, and the RRC connection resume message is used for indicating that the network device agrees to resume the RRC connection with the terminal device, and the RRC connection reject message is used for indicating that the network device refuses to establish the RRC connection with the terminal device, and the RRC connection release message is used for indicating that the network device releases the RRC connection with the terminal device.

Optionally, in some embodiments, the method 200 may further include:

the terminal device sending a second message to the network device, where the second message including indication information, and the indication information being used for indicating that the process of the RRC connection setup or resume is used for requesting configuring or updating the direct link resource.

That is, in the process of the RRC connection setup or resume, the terminal device may send the second message to the network device so as to request the network device to configure or update the direct link resource through carrying the indication information in the second message. Further, the network device may send the first message to the terminal device according to the second message so as to realize the configuration or update of the direct link resource of the terminal device.

Optionally, in some cases, if the direct link resource that has been configured on the terminal device is insufficient, for example, if the direct link resource configured currently is insufficient due to that the number of terminal devices on the direct link where the terminal device is located increases or the traffic volume of the terminal device increases, or the direct link resource which has been configured cannot meet the transmission requirement of current direct communication, such as quality of service (QoS) or delay requirement, etc., at this time, the terminal device needs to request obtaining a new direct link resource, and the direct link resource is not used for all terminal devices. In this case, the terminal device may not obtain the direct link resource through the system information or the dedicated signaling, but request obtaining the direct link resource through the process of the RRC connection setup or resume, which is beneficial to the realizing the timely configuration or update of the direct link resource.

Optionally, the second message may be any message sent by the terminal device to the network device in a process of an existing RRC connection setup or resume, for example, an RRC connection request, an RRC connection resume request, an RRC connection setup complete or an RRC connection resume complete, etc. Or a new message may be added in the process of the RRC connection setup or resume, and the new message is specially used for the terminal device to request to configure or update the direct link resource. It may be understood that if the second message is an existing RRC message, the second message may have the same function as the existing RRC message when the indication information is not included in the second message, and the second message may have both the function of the existing RRC message and the function of requesting configuring and updating the direct link resource or the second message may only have the function of requesting configuring or updating the direct link resource when the indication information is included in the second message, in this case, the process of the RRC connection setup or resume is actually the process of configuration or update of the direct link resource.

It should be understood that the RRC connection request is used for requesting establishing the connection with the network device, and the RRC connection resume request is used for requesting re-establishing the connection with the network device, and the RRC connection setup complete is used for indicating completion of establishing the connection with the network device.

Optionally, in the embodiments of the present application, the information of the direct link resource includes at least one of:
  a first resource or a first resource pool for direct link sending or receiving;
  a using condition of the first resource or the first resource pool; and
  a relationship between the first resource or the first resource pool and a second resource or a second resource pool, where the second resource or the second resource pool is a direct link resource configured before the first resource or the first resource pool.

Optionally, in the embodiments of the present application, the using condition of the first resource or the first resource pool includes at least one of:
  a using time range, a using area range, a number of supported terminal devices and size of supported traffic volume of the first resource or the first resource pool.

As an example not a limitation, the using area range is one of:
  a single cell, multiple cells, a tracking area (TA) and a radio access network area (RAN Area, RA).

Optionally, in some cases, the network device may determine the cell, the TA or the RA in which the terminal device often appears with historical movement information of the terminal device. Further, a corresponding direct link resource is configured for the aforementioned area, so that when moved to the aforementioned area, the terminal device may directly use the configured direct link resource to perform direct communication, thereby improving communication efficiency. Here, the using area range of the direct link resource may include the cell, the TA or the RA in which the terminal device often appears.

Optionally, the using time range may be a timer, i.e. after the timer expires, the first resource or the first resource pool invalidates, i.e. is unavailable.

Optionally, in the embodiments of the present application, the information of the direct link resource may also include a using condition of the second resource or the second resource pool, for example, the using condition of the second resource or the second resource pool includes at least one of:
  a using time range, a using area range, a number of supported terminal devices and size of supported traffic volume of the second resource or the second resource pool.

That is, the network device may also configure a use condition of an old direct link resource. In this way, the terminal device may use the corresponding direct link resource when meeting different using conditions, which is beneficial to meeting the requirements of different scenarios.

For example, if the resource in the first resource or the first resource pool (i.e. the new direct link resource) is richer, and the resource in the second resource or the second resource pool (i.e. the old direct link resource) is less, the using condition of the first resource or the first resource pool may be configured that the number of the terminal devices on the direct link does not exceed a first threshold, and the using condition of the second resource or the second resource pool may be configured that the number of the terminal devices on the direct link does not exceed a second threshold, where the second threshold is less than the first threshold. Assuming that the first threshold is 8 and the second threshold is 5, in the case that the number of the terminal devices on the direct link is greater than 5, the terminal device may choose to use the first resource or the first resource pool to perform direct communication, which is beneficial to avoiding the problem that using the old direct link resource causes resources insufficient and affects direct communication.

For another example, assuming that quality of the direct communication using the first resource or the first resource pool is better when the terminal device is located in cell 1, and quality of the direct communication using the second resource or the second resource pool is better when the terminal is located in cell 2, then it may be configured that the using condition of the first resource or the first resource pool is cell 1 and the using condition of the second resource or the second resource pool is cell 2. Then in the case the cell in which the terminal device is located currently is cell 1, the terminal device may choose to use the first resource or the first resource pool for direct communication, which is beneficial to improving communication quality and communication efficiency.

Optionally, in some embodiments, the network device may also configure the relationship between the first resource or the first resource pool and the second resource or the second resource pool, for example, which may be a complementary relationship or a substitution relationship, where the complementary relationship is used for indicating that both the first resource or the first resource pool and the second resource or the second resource pool can be used for the direct link communication, and the substitution relationship is used for indicating that the second resource or the second resource pool is no longer used in the case the first resource or the first resource pool being configured.

That is, the network device may not only configure or update the direct link resource for the terminal device, but may also configure a using mode of the old direct link resource for the terminal device, for example, in the case the new direct link resource configured, the new direct link resource may be used only for direct communication, or the new direct link resource and the old direct link resource may be combined as the resource of the direct communication, or if the using conditions of the new direct link resource and the old direct link resource are configured, the corresponding direct link resource may also be used for direct communication according to the using condition, which is not limited by the embodiments of the present application.

Hereinafter, a method of wireless communication according to the embodiments of the present application is illustrated in conjunction with the two specific scenarios shown in FIG. 3 and FIG. 4.

As shown in FIG. 3, in S11, a terminal device sends an RRC connection setup or resume request to a network device.

Optionally, in some embodiments, indication information may be included in the RRC connection setup or resume request to indicate that a process of an RRC connection setup or resume is used for configuring or updating a direct link resource.

In S12, the terminal device may receive an RRC connection setup or resume message sent by the network device, and the RRC connection setup or resume message includes information of the direct link resource, where the information of the direct link resource may include the various contents of the aforementioned embodiments, which is not repeatedly described here.

In S13, the terminal device sends an RRC connection setup or resume complete message to the network device, and the RRC connection setup or resume complete message may be used for indicating to the network device that the direct link resource configuration is successful.

Optionally, in some embodiments, the terminal device may also carry the indication information through the RRC connection setup or resume complete message to indicate that the terminal device requests to configure or update the direct link resource.

In S14, the network device sends an RRC connection release message to the terminal device.

Optionally, if the indication information is carried in the RRC connection setup or resume complete message, the network device may configure or update the direct link resource through the RRC connection release message.

As shown in FIG. 4, in S21, a terminal device sends an RRC connection setup or resume request to a network device, and indication information may be included in the RRC connection setup or resume request to indicate that the process of the RRC connection setup or resume is used for configuring or updating a direct link resource.

In S22, the terminal device may receive an RRC connection release or reject message sent by the network device, and the RRC connection release or reject message includes information of the direct link resource.

FIG. 5 is a method of wireless communication according to another embodiment of the present application, and the method may be performed by the terminal device in the communication system shown in FIG. 1. As shown in FIG. 5, the method 30 may include the following content.

In S31, a terminal device receives system information sent by a network device, where the system information includes information of a first direct link resource configured or updated by the network device, and where the terminal device is in an idle state or an inactive state.

In S32, the terminal device determines a target direct link resource for a direct link according to the information of the first direct link resource.

In the embodiments of the present application, the terminal device may obtain the information of the configured or updated first direct link resource through the system information sent by the network device. Optionally, the information of the first direct link resource includes at least one of:
  a sending resource or a receiving resource for a direct link;
  an applicable range of the sending resource or the receiving resource; and
  information of a direct link resource corresponding to an adjacent cell, an adjacent tracking area (TA) or an adjacent radio access network area (RA).

Optionally, the applicable range of the sending resource or the receiving resource is one of:
  multiple cells, a tracking area (TA) and a radio access network area (RA).

It should be understood that for the applicable range of the sending resource or the receiving resource here, the using condition of the first resource or the first resource pool in the aforementioned embodiments may be referred to, which is not repeatedly described here.

In the embodiments of the present application, the network device may not only configure the information of the direct link resource of the cell, the TA or the RA in which the terminal device is located currently, but may also configure the direct link resource of the adjacent cell, the adjacent TA or the adjacent RA. In this way, when moved to the adjacent cell, the adjacent TA or the adjacent RA, the terminal device does not need to request obtaining the direct link resource from the network device, but may directly use the direct link resource to direct communicate, which is beneficial to improving communication efficiency.

Optionally, in some cases, if mobility of the terminal device is relatively strong, the network device may determine the cell, the TA or the RA in which the terminal device often appears with historical movement information of the terminal device. Further, a corresponding direct link resource is configured for the aforementioned area, so that when moved to the aforementioned area, the terminal device may directly use the direct link resource to direct communicate, thereby improving the communication efficiency.

Optionally, in the embodiments of the present application, the system information may also include an applicable range of a second direct link resource, where the second direct link resource is the direct link resource configured before the first direct link resource, for example, the applicable range of the second direct link resource includes at least one of: multiple cells, a tracking area (TA) and a radio access network area (RA).

That is, the network device may also configure an applicable range of an old direct link resource. In this way, the terminal device may use the corresponding direct link resource when meeting different applicable ranges, which is beneficial to meeting the actual transmission requirements. For specific procedures, the relevant description of the aforementioned embodiments may be referred to, which is not repeatedly described here.

Optionally, in some embodiments, S32 may specifically include:
  the terminal device using the first direct link resource and the second direct link resource as the target direct link resource, where the second direct link resource is the direct link resource configured before the first direct link resource; or the terminal device using the first direct link resource as the target direct link resource.

That is, in the case that a new direct link resource is configured, the terminal device may only use the new direct link resource to direct communicate, or may combine the new direct link resource and the old direct link resource as the resource of the direct communication, or if the network device has configured the applicable ranges of the new direct link resource and the old direct link resource, the terminal device may use the corresponding direct link resource to direct communicate according to the applicable ranges, which is not limited by the embodiment of the present application.

The method of wireless communication according to the embodiments of the present application is described above in detail from the perspective of the terminal device in conjunction with FIG. 2 to FIG. 5, and the method of wireless communication according to another embodiment of the present application will be described below in detail from the perspective of the network device in conjunction with FIG. 6 and FIG. 7. It should be understood that the description of the network device side and the description of the terminal device side are mutually corresponding, and similar description may be referred to the above, which is not repeated described here to avoid repetition.

Figure 6:
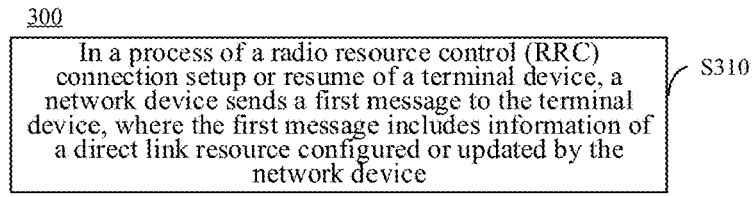
FIG. 6 is a schematic diagram of a method of wireless communication provided by still another embodiment of the present application.

FIG. 6 is a schematic flow diagram of a method of wireless communication 300 according to an embodiment of the present application. The method 300 may be performed by the network device in the communication system shown in FIG. 1. As shown in FIG. 6, the method 300 includes the following content.

In S310, in a process of a radio resource control (RRC) connection setup or resume of a terminal device, a network device sends a first message to the terminal device, the first message including information of a direct link resource configured or updated by the network device.

Optionally, in some embodiments, the first message is one of the following messages:
an RRC connection setup message, an RRC connection resume message, an RRC connection release message or an RRC connection reject message.

Optionally, in some embodiments, the method 300 further includes:
the network device receiving a second message sent by the terminal device, where the second message includes indication information, and the indication information indicates that the process of the RRC connection setup or resume is used for requesting configuring or updating the direct link resource.

Optionally, in some embodiments, the second message is an RRC connection setup request message, an RRC connection resume request message or an RRC connection setup complete message.

Optionally, in some embodiments, the information of the direct link resource includes at least one of:
a first resource or a first resource pool for direct link sending or receiving;
a using condition of the first resource or the first resource pool; and
a relationship between the first resource or the first resource pool and a second resource or a second resource pool, where the second resource or the second resource pool is a direct link resource configured before the first resource or the first resource pool.

Optionally, in some embodiments, the using condition of the first resource or the first resource pool includes a using time range and/or a using area range of the first resource or the first resource pool.

Optionally, in some embodiments, the using area range is one of:
a single cell, multiple cells, a tracking area (TA) and a radio access network area (RA).

Optionally, in some embodiments, the relationship between the first resource or the first resource pool and the second resource or the second resource pool is a complementary relationship or a substitution relationship, where the complementary relationship is used for indicating that both the first resource or the first resource pool and the second resource or the second resource pool can be used for direct link communication, and the substitution relationship is used for indicating that the second resource or the second resource pool is no longer used in the case the first resource or the first resource pool being configured.

Optionally, in some embodiments, the direct link resource is a resource for a direct link of device to device (D2D) or a resource for a direct link of vehicle to everything (V2X).

Optionally, in some embodiments, before receiving, by the network device, the second message sent by the terminal device, the terminal device is in an idle state or an inactive state.

Figure 7:
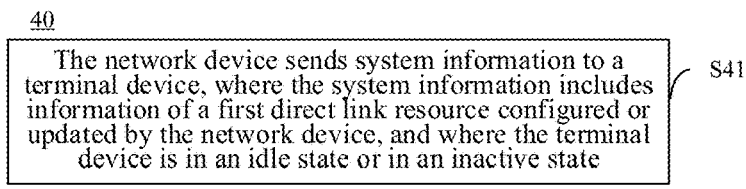
FIG. 7 is a schematic diagram of a method of wireless communication provided by still another embodiment of the present application.

FIG. 7 is a schematic flow diagram of a method of wireless communication 41 according to another embodiment of the present application. The method 40 may be performed by the network device in the communication system shown in FIG. 1. As shown in FIG. 7, the method 40 includes the following content.

In S41, a network device sends system information to a terminal device, where the system information includes information of a first direct link resource configured or updated by the network device, and where the terminal device is in an idle state or an inactive state.

Optionally, in some embodiments, the information of the first direct link resource includes at least one of: a sending resource or a receiving resource for a direct link; an applicable range of the sending resource or the receiving resource; and information of a direct link resource corresponding to an adjacent cell, an adjacent tracking area (TA) or an adjacent radio access network area (RA).

Optionally, in some embodiments, the applicable range of the sending resource or the receiving resource is one of: multiple cells, a tracking area (TA) and a radio access network area (RA).

The method embodiments of the present application are described above in detail in conjunction with FIG. 2 to FIG. 7, and the apparatus embodiments of the present application are described below in detail in conjunction with FIG. 8 to FIG. 14. It should be understood that the apparatus embodiments and the method embodiments are mutually corresponding, and similar description may refer to the method embodiments.

Figure 8:
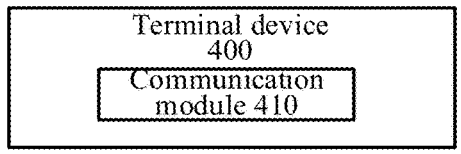
FIG. 8 is a schematic block diagram of a terminal device provided by one embodiment of the present application.

FIG. 8 shows a schematic block diagram of a terminal device 400 according to an embodiment of the present application. As shown in FIG. 8, the terminal device 400 includes:
a communication module 410, configured to receive a first message sent by a network device in a process of a radio resource control (RRC) connection setup or resume of the terminal device, where the first message includes information of a direct link resource configured or updated by the network device.

Optionally, in some embodiments, the first message is one of the following messages: an RRC connection setup message, an RRC connection resume message, an RRC connection release message or an RRC connection reject message.

Optionally, in some embodiments, the communication module is further configured to: send a second message to the network device, where the second message includes indication information, and where the indication information is used for indicating that the process of the RRC connection setup or resume is used for requesting configuring or updating the direct link resource.

Optionally, in some embodiments, the second message is an RRC connection setup request message, an RRC connection resume request message or an RRC connection setup complete message.

Optionally, in some embodiments, the information of the direct link resource includes at least one of: a first resource or a first resource pool used for direct link sending or receiving;
a using condition of the first resource or the first resource pool; and
a relationship between the first resource or the first resource pool and a second resource or a second resource pool, where the second resource or the second resource pool is a direct link resource configured before the first resource or the first resource pool.

Optionally, in some embodiments, the using condition of the first resource or the first resource pool includes a using time range and/or a using area range of the first resource or the first resource pool.

Optionally, in some embodiments, the using area range is one of:
a single cell, multiple cells, a tracking area (TA) and a radio access network area (RA).

Optionally, in some embodiments, the relationship between the first resource or the first resource pool and the second resource or the second resource pool is a complementary relationship or a substitution relationship, where the complementary relationship is used for indicating that both the first resource or the first resource pool and the second resource or the second resource pool can be used for direct link communication, and the substitution relationship is used for indicating that the second resource or the second resource pool is no longer used in the case the first resource or a first resource pool being configured.

Optionally, in some embodiments, the direct link resource is a resource for a direct link of device to device (D2D) or a resource for a direct link of vehicle to everything (V2X).

Optionally, in some embodiments, before sending the second message to the network device the terminal device is in an idle state or an inactive state.

Figure 9:
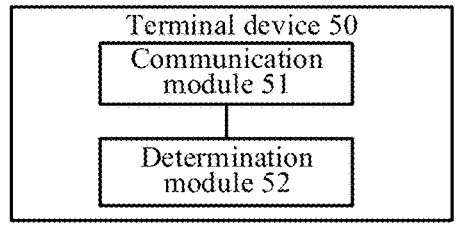
FIG. 9 is a schematic block diagram of a terminal device provided by another embodiment of the present application.

FIG. 9 shows a schematic block diagram of a terminal device 50 according to an embodiment of the present application. As shown in FIG. 9, the terminal device 50 includes:

- a communication module 51, configured to receive system information sent by a network device, where the system information includes information of a first direct link resource configured or updated by the network device, and where the terminal device is in an idle state or an inactive state;
- a determination module 52, configured to determine a target direct link resource for a direct link according to the information of the first direct link resource.

Optionally, the information of the first direct link resource includes at least one of:
- a sending resource or a receiving resource for a direct link;
- an applicable range of the sending resource or the receiving resource; and
- information of a direct link resource corresponding to an adjacent cell, an adjacent tracking area (TA) or an adjacent radio access network area (RA).

Optionally, the applicable range of the sending resource or the receiving resource is one of:
- multiple cells, a tracking area (TA) and a radio access network area (RA).

Optionally, in some embodiments, the determination module is specifically configured to:
- use the first direct link resource and a second direct link resource as the target direct link resource, where the second direct link resource is a direct link resource configured before the first direct link resource; or
- use the first direct link resource as the target direct link resource.

Figure 10:
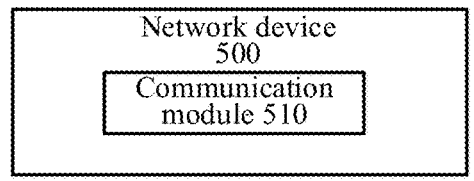
FIG. 10 is a schematic block diagram of a network device provided by one embodiment of the present application.

FIG. 10 is a schematic block diagram of a network device according to an embodiment of the present application. The network device 500 from FIG. 10 includes:
- a communication module 510, configured to send a first message to a terminal device in a process of a radio resource control (RRC) connection setup or resume of the terminal device, where the first message includes information of a direct link resource configured or updated by the network device.

Optionally, in some embodiments, the first message is one of the following messages:
- an RRC connection setup message, an RRC connection resume message, an RRC connection release message or an RRC connection reject message.

Optionally, in some embodiments, the communication module is further configured to: receive a second message sent by the terminal device, where the second message includes indication information, and where the indication information is used for indicating that process of the RRC connection setup or resume is used for requesting configuring or updating of the direct link resource.

Optionally, in some embodiments, the second message is an RRC connection setup request message, an RRC connection resume request message or an RRC connection setup complete message.

Optionally, the information of the direct link resource includes at least one of:
- a first resource or a first resource pool for direct link sending or receiving;
- a using condition of the first resource or the first resource pool; and
- a relationship between the first resource or the first resource pool and a second resource or a second resource pool, where the second resource or the second resource pool is a direct link resource configured before the first resource or the first resource pool.

Optionally, in some embodiments, the using condition of the first resource or the first resource pool includes a using time range and/or a using area range of the first resource or the first resource pool.

Optionally, in some embodiments, the using area range is one of:
- a single cell, multiple cells, a tracking area (TA) and a radio access network area (RA).

Optionally, in some embodiments, the relationship between the first resource or the first resource pool and the second resource or the second resource pool is a complementary relationship or a substitution relationship, where the complementary relationship is used for indicating that both the first resource or the first resource pool and the second resource or the second resource pool can be used for direct link communication, and the substitution relationship is used for indicating that the second resource or the second resource pool is no longer used in the case the first resource or the first resource pool being configured.

Optionally, in some embodiments, the direct link resource is a resource for a direct link of device to device (D2D) or a resource for a direct link of vehicle to everything (V2X).

Optionally, in some embodiments, before the network device receives the second message sent by the terminal device, the terminal device is in an idle state or an inactive state.

Figure 11:
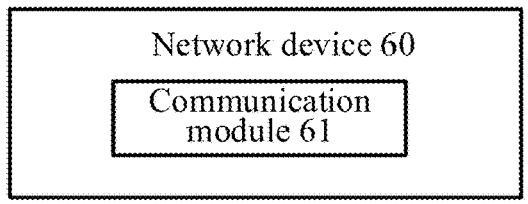
FIG. 11 is a schematic block diagram of a network device provided by another embodiment of the present application.

FIG. 11 is a schematic block diagram of a network device according to an embodiment of the present application. The network device 60 from FIG. 11 includes:
- a communication module 61, configured to send system information to a terminal device, where the system information includes information of a first direct link resource configured or updated by the network device, and where the terminal device is in an idle state or an inactive state.

Optionally, the information of the first direct link resource includes at least one of:
- a sending resource or a receiving resource for a direct link;
- an applicable range of the sending resource or the receiving resource;
- information of a direct link resource corresponding to an adjacent cell, an adjacent track area (TA) or an adjacent radio access network area (RA).

Optionally, the applicable range of the sending resource or the receiving resource is one of:
- multiple cells, a tracking area (TA) and a radio access network area (RA).

Figure 12:
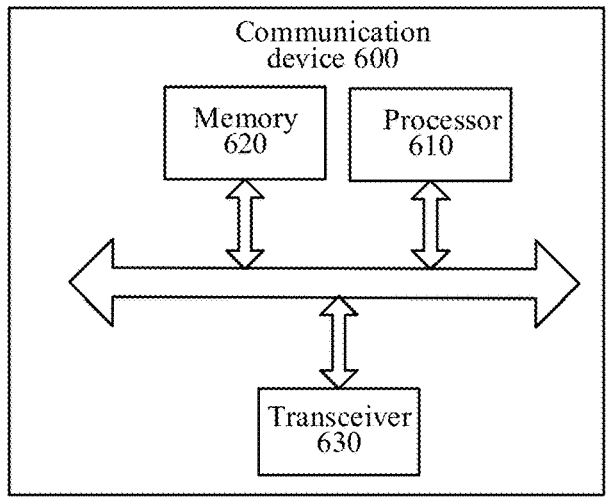
FIG. 12 is a schematic block diagram of a communication device provided by another embodiment of the present application.

FIG. 12 is a schematic structure diagram of a type of communication device 600 provided by an embodiment of the present application. The communication device 600 shown in FIG. 12 includes a processor 610, and the processor 610 may call and run a computer program from a memory to realize the method in the embodiments of the present application.

Optionally, as shown in FIG. 12, the communication device 600 may also include a memory 620, where the processor 610 may call and run the computer program from the memory 620 to realize the method in the embodiments of the present application.

The memory 620 may be one individual device independent of the processor 610 or may be integrated into the processor 610.

Optionally, as shown in FIG. 6, the communication device 600 may further include a transceiver 630, and the processor 610 may control the transceiver 630 to communicate with other device. Specifically, information or data may be sent to or received from other device.

The transceiver 630 may include a transmitter and a receiver. The transceiver 630 may further include an antenna, and the number of the antennas may be one or more.

Optionally, the communication device 600 may specifically be the network device of the embodiments of the present application, and the communication device 600 may realize the corresponding process realized by the network device in each method of the embodiments of the present application, which is not repeatedly described here for simplicity.

Optionally, the communication device 600 may specifically be the mobile terminal/terminal device of the embodiments of the present application, and the communication device 600 may realize the corresponding process realized by the mobile terminal/terminal device in each method of the embodiments of the present application, which is not repeatedly described here for simplicity.

Figure 13:
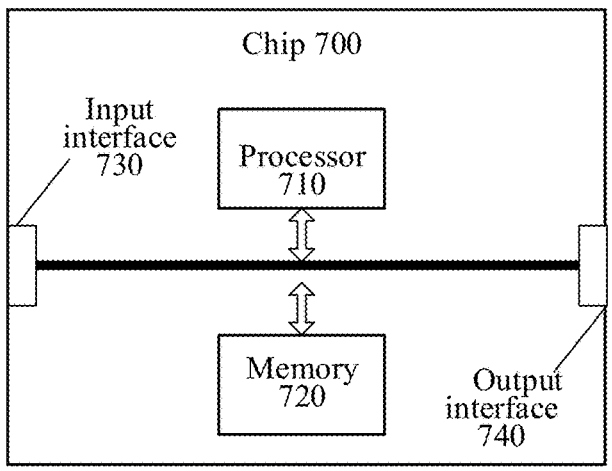
FIG. 13 is a schematic block diagram of a chip provided by an embodiment of the present application.

FIG. 13 is a schematic structure diagram of a chip of the embodiments of the present application. The chip 700 shown in FIG. 13 includes a processor 710, and the processor 710 may call and run a computer program from a memory to realize the methods in the embodiments of the present application.

Optionally, as shown in FIG. 13, the chip 700 may further include a memory 720. The processor 710 may call and run the computer program from the memory 720 to realize the methods in the embodiments of the present application.

The memory 720 may be one individual device independent of the processor 710 or may also be integrated into the processor 710.

Optionally, the chip 700 may further include an input interface 730. The processor 710 may control the input interface 730 to communicate with other device or chip. Specifically, information or data sent by other device or chip may be obtained.

Optionally, the chip 700 may further include an output interface 740. The processor 710 may control the output interface 740 to communicate with other device or chip. Specifically, information or data may be sent to other device or chip.

Optionally, the chip is applicable to the network device in the embodiments of the present application, and the chip may realize the corresponding process realized by the network device in each method of the embodiments of the present application, which is not repeatedly described here for simplicity.

Optionally, the chip is applicable to the mobile terminal/terminal device in the embodiments of the present application, and the chip may realize the corresponding process realized by the mobile terminal/terminal device in each method of the embodiments of the present application, which is not repeatedly described here for simplicity.

It should be understood that the chip mentioned in embodiments of the present application may also be referred to as a system-on-a-chip, a system-on-chip, a system on chip or a system on a chip, etc.

Figure 14:
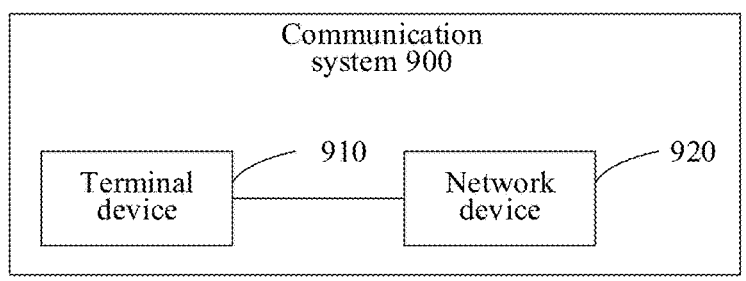
FIG. 14 is a schematic block diagram of a communication system provided by an embodiment of the present application.

FIG. 14 is a schematic block diagram of a type of communication system 900 provided by an embodiment of the present application. As shown in FIG. 14, the communication system 900 includes a terminal device 910 and a network device 920.

The terminal device 910 may be used for realizing the corresponding function realized by the terminal device in the aforementioned methods and the network device 920 may be used for realizing the corresponding function realized by the network device in the aforementioned methods, which is not repeatedly described here for simplicity.

It should be understood that a processor of the embodiments of the present application may be a type of integrated circuit chip, with a signal processing capability. In the realization process, each step of the aforementioned method embodiments may be completed through integrated logic circuits of hardware or instructions in a form of software in the processor. The aforementioned processor may be a general-purpose processor, a digital signal processor (DSP), an application specific integrated circuit (ASIC), a field programmable gate array (FPGA) or other programmable logic devices, discrete gates or transistor logic devices, discrete hardware components. Each method, step and logic block diagram disclosed in the embodiments of the present application may be realized or performed. The general-purpose processor may be a microprocessor, or the processor may also be any conventional processor, etc. The steps of the methods disclosed in combination with the embodiments of the present application may be directly completed by a hardware decoding processor, or completed byh a combination of hardware and a software module in the decoding processor. The software module may be located in other mature storage medium in the field such as a random access memory, a flash memory, a read-only memory, a programmable ROM or an electrically EPROM, a register or the like. The storage medium is located in the memory, and the processor reads information in a memory so as to complete the steps of the aforementioned methods in conjunction with its hardware.

It is understood that the memory in the embodiments of the present application may be a volatile memory or a non-volatile memory, or may include both a volatile memory and a non-volatile memory. The nonvolatile memory may be a read-only memory (ROM), a programmable ROM (PROM), an erasable PROM (EPROM), an electrically EPROM (EEPROM) or a flash memory. The volatile memory may be a random access memory (RAM), and it is used as an external cache. Through exemplary but not limitative illustration, many forms of RAM are available, for example, a static RAM (SRAM), a dynamic RAM (DRAM), a synchronous DRAM (SDRAM), a double data rate SDRAM (DDR SDRAM), an enhanced SDRAM (ESDRAM), a synch link DRAM (SLDRAM) and a direct Rambus RAM (DR RAM). It should be noted that the memory of the systems and methods described herein is intended to include, but not limited to, these and any other suitable types of memories.

It should be understood that the aforementioned memories are exemplarily but not limitative illustration. For example, the memory in the embodiments of the present application may also be a static SRAM (SRAM), a dynamic RAM (DRAM), a synchronous DRAM (SDRAM), a double data rate SDRAM (DDR SDRAM), an enhanced SDRAM (enhanced SDRAM), a synch link DRAM (SLDRAM) and a direct Rambus RAM (DR RAM), etc. That is, the memory in the embodiments of the present application is intended to include, but not limited to, these and any other suitable types of memories.

The embodiments of the present application also provide a computer-readable storage medium for storing a computer program.

Optionally, the computer-readable storage medium is applicable to the network device in the embodiments of the present application, and the computer program causes a computer to perform the corresponding process realized by the network device in each method of the embodiments of the present application, which is not repeatedly described here for simplicity.

Optionally, the computer-readable storage medium is applicable to the mobile terminal/terminal device in the embodiments of the present application, and the computer program causes a computer to perform the corresponding process realized by the mobile terminal/terminal device in each method of the embodiments of the present application, which is not repeatedly described here for simplicity.

The embodiments of the present application also provide a computer program product, including a computer program instruction.

Optionally, the computer program product is applicable to the network device in the embodiments of the present application, and the computer program instruction causes a computer to perform the corresponding process realized by the network device in each method of the embodiments of the present application, which is not repeatedly described here for simplicity.

Optionally, the computer program product is applicable to the mobile terminal/terminal device in the embodiments of the present application, and the computer program instruction causes a computer to perform the corresponding process realized by the mobile terminal/terminal device in each method of the embodiments of the present application, which is not repeatedly here for simplicity.

The embodiments of the present application also provide a computer program.

Optionally, the computer program is applicable to the network device in the embodiments of the present application. When the computer program being run on a computer, a computer is caused to perform the corresponding process realized by the network device in each method of the embodiments of the present application, which is not repeatedly described here for simplicity.

Optionally, the computer program is applicable to the mobile terminal/terminal device in the embodiments of the present application. When the computer program being run on a computer, the computer is caused to perform the corresponding process realized by the mobile terminal/terminal device in each method of the embodiments of the present application, which is not repeatedly described here for simplicity.

Those of ordinary skilled in the art may realize that the unit and algorithm step of each example described in conjunction with the embodiments disclosed herein can be realized with electronic hardware, or a combination of computer software and electronic hardware. Whether these functions are performed by hardware or software depends on the specific application and design constraint of the technical solution. Professionals may use a different method to realize the described function for each specific application, but such realization should not be considered beyond the scope of the present application.

Those of skilled in the art may clearly understand that for the convenience and simplicity of the illustration, for the specific working process of the systems, apparatuses and units described above, the corresponding process in the aforementioned method embodiments may be referred to, which is not be repeatedly here.

In several embodiments provided by the present application, it should be understood that the system, apparatus and method disclosed may be realized in other way. For example, the apparatus embodiments described above are merely schematic. For example, said division of the units is only a type of logical function division, and there may be other division way in actual realization, for example, a plurality of units or components may be combined or integrated into another system, or some features may be ignored or not performed. On the other hand, a mutual coupling, a direct coupling or a communication connection displayed or discussed may be an indirect coupling or a communication connection through some interfaces, apparatuses or units, and may be electrical, mechanical or in other form.

The unit illustrated as a separate component may or may not be physically separate, and a component displayed as a unit may or may not be a physical unit, i.e., it may be located in one place or may also be distributed onto a plurality of network units. Some or all of the units may be selected according to the actual need to realize the objective of the solution of the present embodiments.

In addition, each functional unit in each embodiment of the present application may be integrated into one processing unit, or it may be that each unit exists alone physically, or it may be that two or more units are integrated into one unit.

The functions may also be stored in a computer-readable storage medium if being implemented in the form of a software functional unit and sold or used as an independent product. Based on such understanding, the essence of the technical solution of the present application or the part contributing to the related art or part of the technical solution may be embodied in the form of a software product, and the computer software product is stored in a storage medium including several instructions such that a computer device (which may be a personal computer, a server, or a network device, etc.) executes all or part of the steps of the method described in each embodiment of the present application. The aforementioned storage medium includes a U disk, a mobile hard disk, a read-only memory (ROM), a random access memory (RAM), a magnetic disk or an optical disk and other mediums that can store program codes.

The foregoing descriptions are merely specific implementations of the embodiments of the present application, and the protection scope of the embodiments of the present application is not limited thereto. Any person skilled in the art can easily think of changes or substitutions within the technical scope disclosed in the present application, and all the changes or substitutions should be covered in the protection scope of the present application. Therefore, the protection scope of the present application should be subject to the protection scope of the claims.

What is claimed is:

1. A method of wireless communication, comprising:
receiving, by a terminal device, a first message sent by a network device in a process of a radio resource control (RRC) connection setup or resume of the terminal device, wherein the first message comprises information of a direct link resource configured or updated by the network device;

wherein the information of the direct link resource comprises at least one of:
- a first resource or a first resource pool used for direct link sending or receiving;
- a using condition of the first resource or the first resource pool; and
- a relationship between the first resource or the first resource pool and a second resource or a second resource pool, wherein the second resource or the second resource pool is a direct link resource configured before the first resource or the first resource pool.

2. The method according to claim 1, wherein the first message is one of the following messages:
an RRC connection setup message, an RRC connection resume message, an RRC connection release message or an RRC connection reject message.

3. The method according to claim 1, further comprising:
sending, by the terminal device, a second message to the network device, wherein the second message comprises indication information, and the indication information is used for indicating that the process of the RRC connection setup or resume is used for requesting configuring or updating the direct link resource.

4. The method according to claim 3, wherein the second message is an RRC connection setup request message, an RRC connection resume request message, or an RRC connection setup complete message.

5. The method according to claim 1, wherein the using condition of the first resource or the first resource pool comprises a using time range and/or a using area range of the first resource or the first resource pool.

6. The method according to claim 5, wherein the using area range is one of:
a single cell, multiple cells, a tracking area (TA) and a radio access network area (RA).

7. The method according to claim 1, wherein the relationship between the first resource or the first resource pool and the second resource or the second resource pool is a complementary relationship or a substitution relationship, wherein the complementary relationship is used for indicating that both the first resource or the first resource pool and the second resource or the second resource pool can be used for direct link communication, and the substitution relationship is used for indicating that the second resource or the second resource pool is no longer used in the case the first resource or the first resource pool being configured.

8. The method according to claim 1, wherein the direct link resource is a resource for a direct link of device to device (D2D) or a resource for a direct link of vehicle to everything (V2X).

9. The method according to claim 3, wherein before sending, by the terminal device, the second message to the network device, the terminal device is in an idle state or in an inactive state.

10. A method of wireless communication, comprising:
sending, by a network device, a first message to a terminal device in a process of a radio resource control (RRC) connection setup or resume of the terminal device, wherein the first message comprises information of a direct link resource configured or updated by the network device;

wherein the information of the direct link resource comprises at least one of:
- a first resource or a first resource pool used for direct link sending or receiving;
- a using condition of the first resource or the first resource pool; and
- a relationship between the first resource or the first resource pool and a second resource or a second resource pool, wherein the second resource or the second resource pool is a direct link resource configured before the first resource or the first resource pool.

11. The method according to claim 10, wherein the first message is one of the following messages:
an RRC connection setup message, an RRC connection resume message, an RRC connection release message or an RRC connection reject message.

12. The method according to claim 10, further comprising:
receiving, by the network device, a second message sent by the terminal device, wherein the second message comprises indication information, and the indication information is used for indicating that the process of the RRC connection setup or resume is used for requesting configuring or updating the direct link resource.

13. A terminal device, comprising:
a processor; and
a memory,
wherein the memory is configured to store a computer program, and the processor is configured to call and run the computer program stored in the memory so as to:
receive a first message sent by a network device in a process a radio resource control (RRC) connection setup or resume of the terminal device, wherein the first message comprises information of a direct link resource configured or updated by the network device;
wherein the information of the direct link resource comprises at least one of:
- a first resource or a first resource pool used for direct link sending or receiving;
- a using condition of the first resource or the first resource pool; and
- a relationship between the first resource or the first resource pool and a second resource or a second resource pool, wherein the second resource or the second resource pool is a direct link resource configured before the first resource or the first resource pool.

14. The terminal device according to claim 13, wherein the first message is one of the following messages: an RRC connection setup message, an RRC connection resume message, an RRC connection release message or an RRC connection reject message.

15. The terminal device according to claim 13, wherein the processor is further configured to: send a second message to the network device, wherein the second message comprises indication information, and the indication information is used for indicating that the process of the RRC connection setup or resume is used for requesting configuring or updating the direct link resource,
wherein the second message is an RRC connection setup request message, an RRC connection resume request message, or an RRC connection setup complete message.

16. The terminal device according to claim 13,
wherein the using condition of the first resource or the first resource pool comprises a using time range and/or a using area range of the first resource or the first resource pool,
wherein the using area range is one of:
a single cell, multiple cells, a tracking area (TA) and a radio access network area (RA).

17. The terminal device according to claim 16, wherein the relationship between the first resource or the first resource pool and the second resource or the second resource pool is a complementary relationship or a substitution relationship, wherein the complementary relationship is used for indicating that both the first resource or the first resource pool and the second resource or the second resource pool can be used for direct link communication, and the substitution relationship is used for indicating that the second resource or the second resource pool is no longer used in the case the first resource or the first resource pool being configured.

18. The terminal device according to claim 13, wherein the direct link resource is a resource for a direct link of device to device (D2D) or a resource for a direct link of vehicle to everything (V2X).

19. The terminal device according to claim 15, wherein before sending the second message to the network device, the terminal device is in an idle state or in an inactive state.

\* \* \* \* \*